US007051333B1

(12) United States Patent
Nylander et al.

(10) Patent No.: US 7,051,333 B1
(45) Date of Patent: May 23, 2006

(54) SYSTEM AND METHOD FOR EXTENDING A PROGRAMMING LANGUAGE TO INCLUDE MULTIPLE DISSIMILAR OBJECT SYSTEMS

(75) Inventors: Charles G. Nylander, Merrimack, NH (US); Cheryl L. Jones, Medfield, MA (US); David A. Foti, Ashland, MA (US)

(73) Assignee: The MathWorks, Inc., Natick, MA (US)

( * ) Notice: Subject to any disclaimer, the term of this patent is extended or adjusted under 35 U.S.C. 154(b) by 644 days.

(21) Appl. No.: 09/912,937

(22) Filed: Jul. 24, 2001

(51) Int. Cl.
*G06F 15/163* (2006.01)

(52) U.S. Cl. ..................................... 719/310
(58) Field of Classification Search ............... 719/310, 719/330
See application file for complete search history.

(56) References Cited

U.S. PATENT DOCUMENTS

| 5,809,302 | A | * | 9/1998 | Wang et al. ............... 717/117 |
| 5,999,988 | A | * | 12/1999 | Pelegri-Llopart et al. ... 719/330 |
| 6,052,729 | A | * | 4/2000 | Robinson .................... 709/224 |
| 6,725,345 | B1 | * | 4/2004 | Baba et al. ................ 711/154 |

OTHER PUBLICATIONS

Ji-Tzay, A tool set to support web application testing, Oct. 1998□□.*

Philip, Java RMI (Remote Method Invocation), Feb. 2001.*
Kevin Henry, Distributed computatin with Java Remote Method Invocation, 2000.*
Yi-Min Wang, COMERA: Com extensible Remoting Architecture, 1998.*

* cited by examiner

*Primary Examiner*—William Thomson
*Assistant Examiner*—LeChi Truong
(74) *Attorney, Agent, or Firm*—Lahive & Cockfield, LLP

(57) ABSTRACT

The illustrative embodiment of the present invention provides a method for extending a programming language to interact with foreign object systems. Through the use of an opaque interface, a requesting unit may interact with multiple foreign object systems. The requesting unit is an executable piece of code such as a script, applet or application. A single set of procedures written into the opaque interface and accessible by the requesting unit enable the requesting unit to interact with the foreign object systems. The foreign object systems register with the opaque interface. The registration process for the object systems includes the creation and registration of a defined set of functions, the format for which is provided by the opaque interface. The defined set of functions are called by the procedures in the opaque interface and execute in the object system. The results of the function execution are returned to the requesting unit thereby extending the foreign object system capabilities to the requesting unit.

33 Claims, 6 Drawing Sheets

SYSTEM AND METHOD FOR EXTENDING A PROGRAMMING LANGUAGE TO INCLUDE MULTIPLE DISSIMILAR OBJECT SYSTEMS

FIELD OF THE INVENTION

The illustrative embodiment of the present invention relates generally to programming languages and more particularly to the extension of a programming language to accommodate multiple dissimilar object systems.

BACKGROUND OF THE INVENTION

Object systems are software systems that provide the capability to define classes and to construct and utilize objects that are specific to that object system. Object systems are also known as object oriented systems and include such well known programming languages as Java, from Sun Microsystems, Inc. of Palo Alto, Calif., C++ from Microsoft Corporation of Redmond, Wash., and MATLAB from The Mathworks of Natick, Mass. An object is a software artifact that has attributes and behaviors. Behaviors are also referred to as functions. The functions of a particular object are utilized or called via the methods contained in a class definition for the object.

Applications and other executable code utilize objects written in their own programming language. For example, a MATLAB application is able to utilize MATLAB objects. Different object systems have different capabilities. It is often desirable for an application written using one programming language to be able to interact with and use objects written in a different object system. Typically, an object system may include support and interoperability for objects of another object system in one of two ways. The programming language of the application may be extended so that the implementation and syntax of the programming language are revised to provide access to the other object system. Unfortunately, this complicates the syntax and the implementation of the programming language. Alternatively, the software application may be written to use Application Programming Interfaces (APIs) which create an interface through which the application may interact with objects of another object system. Unfortunately, the use of an API complicates the writing of the application and binds the application to the object system at those points where the API is utilized. Both methods of extending a programming language to include support for multiple object systems result in complicated applications. Applications using the API method are bound to the foreign object system at those points where the object system is utilized.

SUMMARY OF THE INVENTION

The illustrative embodiment of the present invention provides a method of extending a programming language to include support for multiple object systems. Object systems register a defined set of functions with an opaque interface that is provided between a requesting unit and the object system. The requesting unit is an executable piece of code such as a script, applet or application. The defined set of functions is accessed via a set of procedures contained in the opaque interface. A procedure in the opaque interface calls the appropriate function of the object system provided during registration of the object system. The one set of procedures in the opaque interface supports multiple object systems. The requesting unit is thus able to utilize the programming language capabilities of multiple foreign object systems without knowing the implementation details of the foreign object systems.

In one embodiment of the present invention an opaque interface is created between a requesting unit and a plurality of object systems. The opaque interface includes a defined set of procedures which enable the requesting unit to interact with any of the object systems. Object systems register with the opaque interface by providing a defined set of functions to the opaque interface. The opaque interface includes a record of these registered object systems and associated sets of functions. The requesting unit interacts with the object system by calling a procedure in the opaque interface which calls a registered object system function to perform an operation.

In another embodiment of the present invention, a requesting unit that is written in an array-oriented programming language capable of performing array operations accesses an opaque interface created between the requesting unit and multiple foreign object systems. The opaque interface includes a defined set of procedures which enable the requesting unit to interact with any of the object systems. The requesting unit calls an array creation procedure located in the opaque interface to create an array capable of holding objects of the foreign object system. The opaque interface includes a record of registered object systems and associated sets of functions. The array creation procedure calls one of the registered functions from the object system to create the array. In one aspect of the embodiment, the foreign object system is an array-capable system and the array creation function creates an array of the foreign object system capable of holding objects of the foreign object system using the foreign object system. The array is returned to the requesting unit. In another aspect of the embodiment which applies when the foreign object system is not array-capable, the array creation function utilizes the capabilities of the programming language of the requesting unit to create an array capable of holding objects of the foreign object system. The array is returned to the requesting unit.

DETAILED DESCRIPTION

The illustrative embodiment of the present invention provides a method for extending a programming language to interact with foreign object systems. Through the use of an opaque interface, the method of the present invention allows a requesting unit, such as an application, written in one programming language, to interact with multiple foreign object systems. The method of the present invention does not require the altering of the syntax of the requesting unit's programming language specifically for a particular object system or the use of API's specific to particular object system. A single set of procedures written into the opaque interface enable a requesting unit to interact with multiple foreign object systems. The foreign object systems register with the opaque interface. The registration process for the object systems includes the creation and registration of a defined set of functions. The defined set of functions are called by the procedures in the opaque interface and execute in the object system. The results of the function execution are returned to the requesting unit, thereby extending the foreign object system capabilities to the requesting unit.

Figure 1:
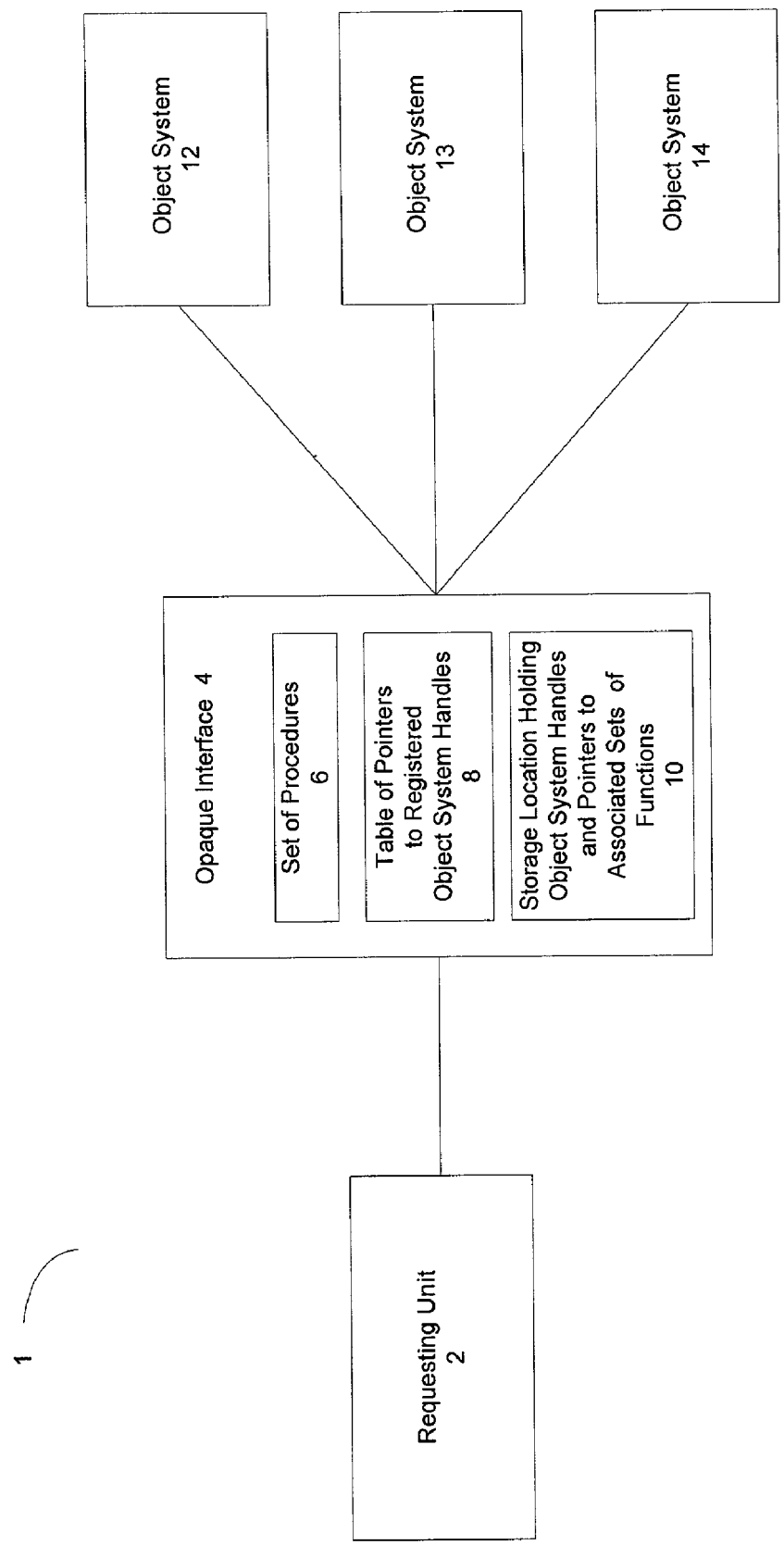
FIG. 1 is a block diagram of an environment suitable for practicing an illustrative embodiment of the present invention.

FIG. 1 depicts an environment suitable for practicing an illustrative embodiment of the present invention. An electronic device 1 includes a requesting unit 2. Also included in the electronic device 1 are object systems 12, 13 and 14. The object systems 12, 13 and 14 each have their own compilers in the electronic device 1 which translate source code from the respective object system programming language into object code (the object code is broken down by the computer system's assembler into machine language for execution). An opaque interface 4 is created between the requesting unit 2 and object systems 12, 13 and 14. The opaque interface 4 includes a set of procedures 6 which are utilized by the requesting unit 2 to communicate with the object systems 12, 13 and 14. The programming language of the requesting unit may include syntax to call the procedures in the opaque interface. Alternatively, the requesting unit 2 may make use of publicly defined procedure calls to access the set of procedures contained in the opaque interface 4. Also included in the opaque interface 4 are a table of pointers 8 to registered object system handles and associated sets of registered object system functions. Object system handles are unique identifiers, also known as "opaque identifiers", such as an integer or pointer, which are assigned to an object system 12, 13, and 14 during the registration process. The registration process requires each object system 12, 13 and 14 to register a defined set of functions with the opaque interface 4. In some embodiments, the opaque interface 4 uses an abstract base class to define the set of functions. A pointer to the associated set of functions and the assigned object system handle is stored in a storage location 10. The pointers in the table of pointers 8, point to the storage location 10 holding the object system handles and pointers to the associated sets of registered functions for the object systems 12, 13 and 14. The registration process required by the method of the present invention is explored in more detail below. Those skilled in the art will recognize that there are many possible methods of storing object system handles and their associated sets of functions that are within the scope of the present invention. For example, a linked list or an array holding records of the object system handles and their associated sets of functions may also be used.

The illustrative embodiment of the present invention creates an opaque interface 4 between a requesting unit 2 and foreign object systems 12, 13 and 14. All communication between the requesting unit 2 and the foreign object systems 12, 13 and 14 takes place via the opaque interface 4. The opaque interface 4 includes a set of procedures 6 which are utilized by the requesting unit 2 to communicate with the foreign object systems 12, 13 and 14. The set of procedures 6 has a one to one correspondence with each defined set of functions associated with an object system. Each set of functions (and by extension each object system 12, 13 and 14) has an identifying handle assigned during the registration process. The identifying handle assigned to an object system is returned to that object system by the opaque registration process. The requesting unit 2 calls a procedure and the procedure calls the corresponding function for the registered object systems 12, 13 and 14. The opaque interface 4 maintains a list of registered foreign object systems 12, 13 and 14.

Figure 2:
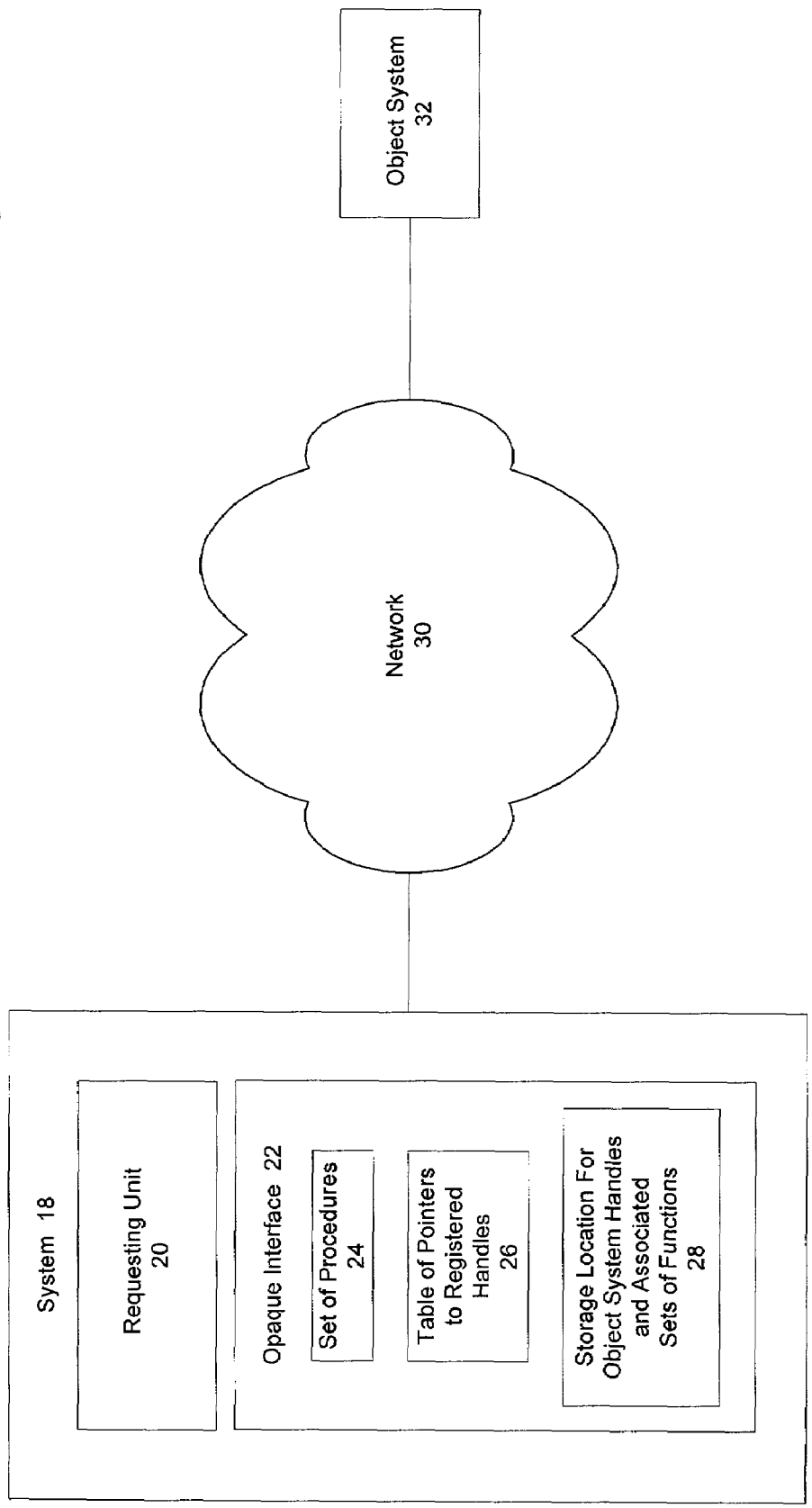
FIG. 2 is an alternative embodiment of an environment suitable for practicing an illustrative embodiment of the present invention.

The foreign object system may not necessarily be located on the same computer system as the application. FIG. 2 depicts an alternate environment for the illustrative embodiment of the present invention. A foreign object system 32 is located remotely from a computer system 18. The computer system 18 and the foreign object system 32 are both interfaced with a network 30. The computer system 18 includes a requesting unit 20. The requesting unit 20 communicates with the foreign object system 32 over the network 30. The requesting unit 20 communicates via an opaque interface 22 also located on the computer system 18. The opaque interface 22 includes a set of procedures 24. Also included in the opaque interface 22 is a pointer table 26 holding pointers to a storage location 28 for object system handles and pointers to associated sets of registered functions. The requesting unit 20 utilizes the set of procedures 24 to communicate with the object systems 32. The registered functions for object systems not located on the same computer system as the requesting unit communicate with the object system over the network and return to the requesting unit the results of utilizing the object system on another computer system.

Figure 3:
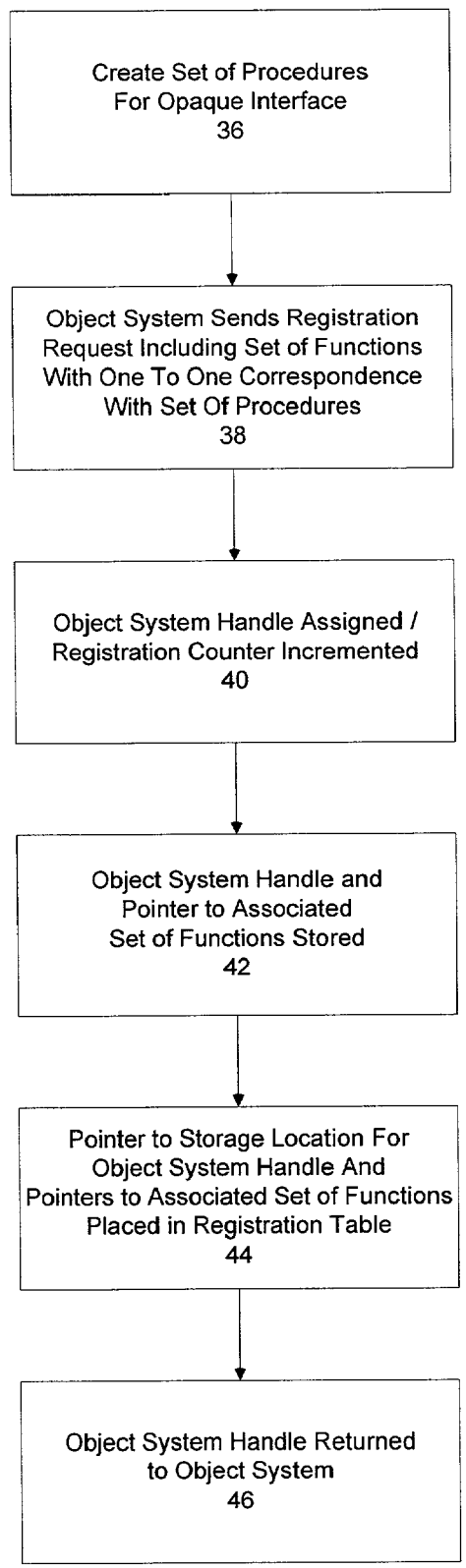
FIG. 3 is a flow chart of the sequence of steps followed by an illustrative embodiment of the present invention during the object system registration process.

FIG. 3 depicts a flow chart of the sequence of steps followed by an illustrative embodiment of the present invention during a foreign object system 12 registration process. A set of procedures 6 is created for the opaque interface 4 (step 36). The set of procedures 6 will be utilized by the requesting unit 2 to interact with a foreign object system 12. The foreign object system 12 sends a registration request, which includes a defined set of functions, to the opaque interface 4 (step 38). The defined set of functions have a one-to-one correspondence with the set of procedures 6 in the opaque interface 4. Every registering foreign object system 12, 13 and 14 is assigned an object system handle, usually an integer number or pointer, which uniquely identifies the foreign object system. The opaque interface 4 maintains a list of registered foreign object systems 12, 13 and 14. Following the assignment of an object system handle to a foreign object system 12, a counter maintained by the opaque interface 4 and used to track the number of registered foreign object systems is incremented (step 40). The assigned object system handle and a pointer to the set of functions that accompany the registration request are stored in a storage location 10 accessible to the opaque interface (step 42). In one aspect of the present embodiment, the object system is located on the same electronic device 1 in which the opaque interface 4 is located. In another aspect of the present embodiment, the object system is located at a different location from the electronic device 1 on which the opaque interface 4 is located. A pointer which points to the storage location for the object system handle and associated set of functions 10 is placed in a registration table maintained by the opaque interface 4 (step 44). The object system handle assigned to an object system is returned to that object system by the registration process (step 46).

Figure 4:
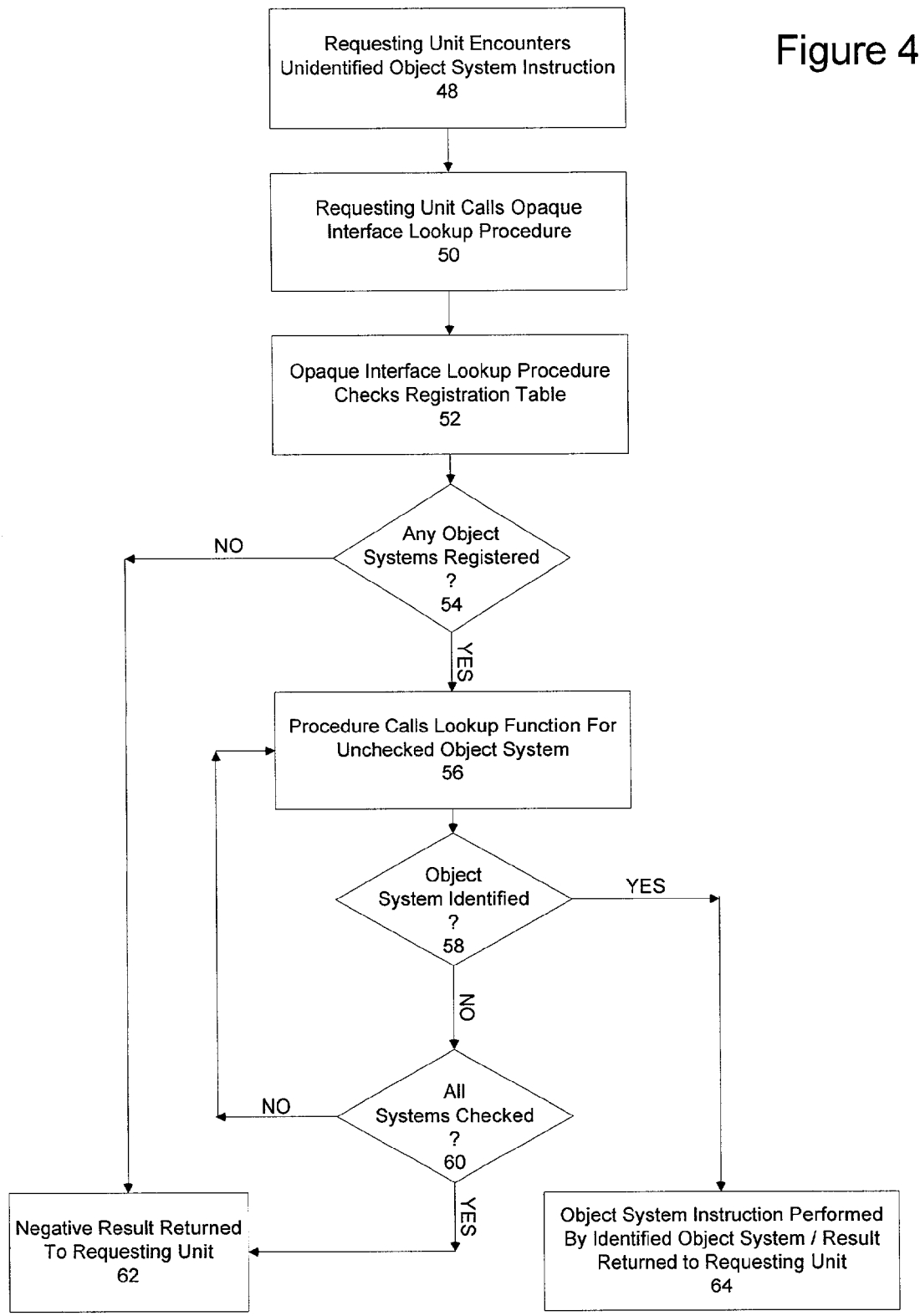
FIG. 4 is a flow chart of an illustrative embodiment of the present invention performing an object system lookup procedure.

FIG. 4 depicts the sequence of steps followed by an illustrative embodiment of the present invention to lookup and execute an unidentified object system instruction. The sequence begins when a requesting unit 2 encounters an unidentified object system instruction (step 48). The requesting unit 2 calls a lookup procedure from the set of procedures 6 contained in the opaque interface 4 (step 50). The opaque interface lookup procedure checks the registration table maintained by the opaque interface 4 (step 52). The procedure determines whether or not any object systems 12 have registered with the opaque interface 4 (step 54). If one or more foreign object systems 12, 13 and 14 have registered with the opaque interface 4, the lookup procedure calls the corresponding lookup function (step 56) for the first registered foreign object system. The lookup function determines whether or not the instruction is a valid instruction for that object system 12 (step 58). If the instruction is recognized as valid by the lookup function, then the object system instruction is considered identified and the instruction is sent to the object system to be performed. Once performed, the result of the executed instruction is returned to the requesting unit (step 64). If the object system instruction is not recognized as valid by the lookup function, the object system instruction is considered unidentified and the sequence checks the registration table to determine whether or not additional foreign object systems 13 and 14 have registered with the opaque interface 4 (step 60). If additional object systems 12 have registered with the opaque interface 4, the opaque interface procedure calls the lookup function for the next unchecked object system (step 56). The sequence continues until all of the object systems 12 in the registration table have been checked (step 60). If all of the object systems in the registration table are checked without identifying the object system instruction, a negative result is returned to the requesting unit 2 (step 62). In order to avoid repetitive lookups of the same object system instruction, some embodiments of the present invention cache the results of the lookup procedure.

In another embodiment of the present invention, a class name from an unidentified object class is used to identify the object system 12 which defines that class. The class name is given as an input variable to a lookup procedure in the opaque interface 4. The lookup procedure calls the corresponding lookup function for registered object systems 12, 13 and 14 in order to identify the object system that defines the class with that name. If any of the functions recognize the class name, the class (and the object system that defines it) are identified.

In one embodiment of the present invention, a class name from an identified object class is used to create an object of that class. The class name and the desired properties of the object to be created are given as input variables to an object creation procedure in the opaque interface 4. The object creation procedure calls the corresponding object creation function for the object system 12 that defines the class with that name. If the properties specified for the desired object are valid for objects of classes with that name, the object system 12 creates the object and returns it to the object creation function. The object creation function creates an object of the requesting unit programming language and inserts the object system handle and object system object into the requesting unit programming language object as elements The requesting unit programming language object is then returned to the requesting unit 2.

In another embodiment of the present invention, a requesting unit operates on an unidentified object by using the opaque interface 4. A procedure in the opaque interface 4 that provides the desired object operation is called by the requesting unit 2 which provides the unidentified object as an input variable. The procedure retrieves from the object the stored object system handle and uses this handle to locate the function registered with the opaque interface 4 by the object system 12 that created the unidentified object. The procedure then calls the appropriate registered function for the object system 12 that created the object, which in turn communicates with the object system to operate on that object.

In a different embodiment of the present invention, the requesting unit 2 that is attempting to communicate with the foreign object system 12 is written in an array-oriented programming language, such as MATLAB. Requesting units written in array-oriented programming languages, that is, programming languages which have the ability to manipulate data in array structures, often need to interact with objects from foreign object systems which may or may not have array capabilities. The method of the present invention enables a requesting unit 2 written in an array-oriented programming language to take advantage of the native array capabilities of foreign object systems, while also using the array capabilities of the requesting unit's programming language to manipulate foreign objects created from foreign object systems which lack array capabilities.

Figure 5:
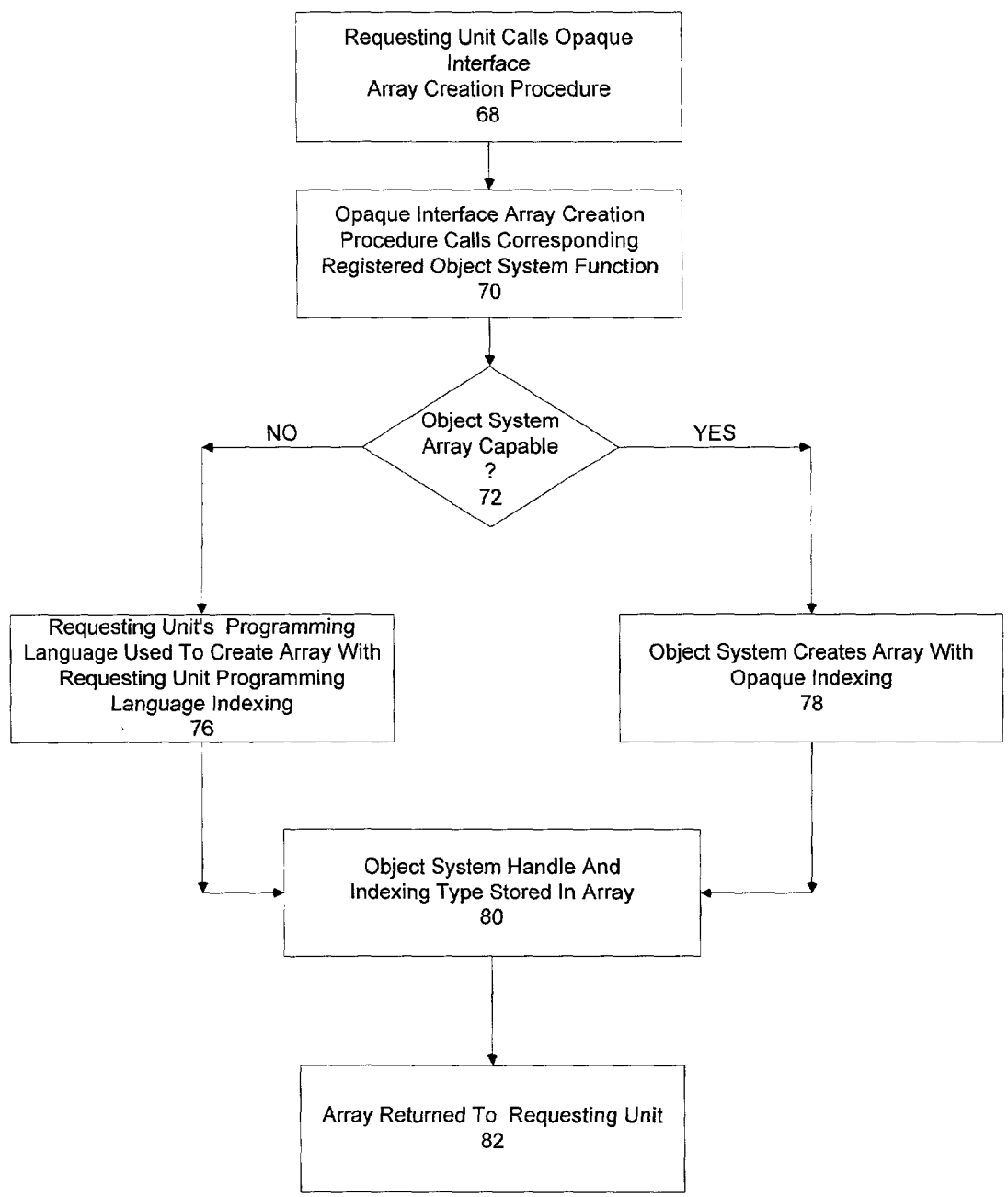
FIG. 5 is a flow chart of the sequence of steps followed by an illustrative embodiment of the present invention creating an array suitable for holding objects of a foreign object system.

FIG. 5 depicts the sequence of steps followed by the illustrative embodiment of the present invention to create arrays for foreign objects regardless of whether or not the foreign object system 12 normally has array capability. The sequence of steps begins when a requesting unit 2, written in an array-oriented language, calls an array creation procedure in the opaque interface 4 (step 68). The array creation procedure calls the corresponding function for a registered object system 12 (step 70). The array creation function is constructed in a manner determined by whether or not the foreign object system has array capabilities. If the array creation function indicates an object system is array capable (step 72) the object system creates an array capable of holding objects from the object system. The created array is indexed using indexing from the foreign object system (step 78). Indexing is a method used to separate one array element from another. Examples of elements include objects, classes, methods, and attributes. The use of foreign object system indexing is referred to as "opaque indexing" since it occurs on the other side of the opaque interface 4 from the requesting unit 2. The array creation procedure inserts the object system handle and the indexing type, opaque indexing, into the array as elements (step 80). Once created, the function returns the array to the requesting unit 2 (step 82). If the array creation function is constructed for a foreign object system that is not array capable (step 72), the array creation procedure uses the requesting unit's programming language to create an array capable of holding objects of the foreign object system. An array created using the requesting unit's programming language is also indexed using the same programming language (step 76), as opposed to the foreign object system "opaque indexing". The object system handle and the application programming language indexing type, such as MATLAB, are inserted as elements into the array (step 80). Once created, the function returns the array to the requesting unit 2 (step 82). For example, if a MATLAB created application seeks to create an array capable of holding the objects of a foreign object system which is not array capable, the array holds the handle of the foreign object system and indicates that MATLAB indexing is being used. Alternatively, if a MATLAB created application attempts to create an array capable of holding Java objects, the handle Java and opaque indexing are inserted as elements into the array since Java has array capabilities and the Java object system is used to index the array.

Figure 6:
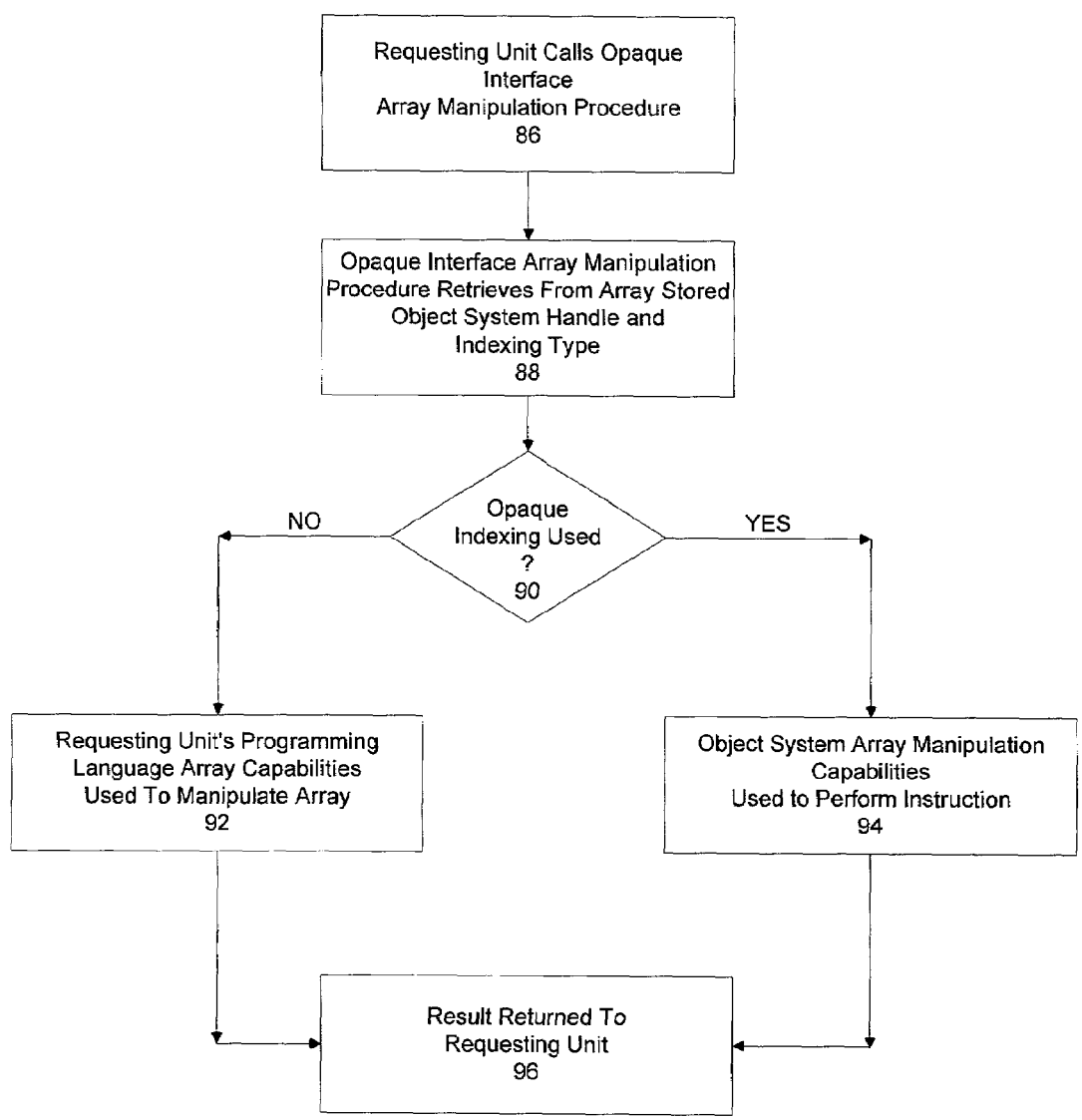
FIG. 6 is a flow chart of an illustrative embodiment of the present invention performing array manipulation procedures.

The process of manipulating arrays created using the illustrative embodiments of the present invention involves identifying the foreign object system and the type of indexing used in the creation of the array. FIG. 6 depicts the sequence of steps utilized by an illustrative embodiment of the present invention in manipulating an array. The sequence begins when a requesting unit written in an array-oriented programming language calls an array manipulation procedure located in the opaque interface 4 (step 86). The array manipulation procedure retrieves from an array the stored object system handle and indexing type (step 88). The array manipulation procedure determines whether or not opaque indexing has been used in the creation of the array (step 90). The presence of opaque indexing indicates that the foreign object system has array capabilities. If the array manipulation procedure indicates that opaque indexing has been used in the creation of the array, the corresponding array manipulation function for the foreign object system is called. The array manipulation function uses the array manipulation capabilities of the foreign object system to perform the array manipulation instruction (step 94). The results of the array manipulation instruction are returned to the requesting unit (step 96). Alternatively, if the array manipulation procedure determines that opaque indexing has not been used in the creation of the array (step 90), the array manipulation procedure uses the array manipulation capabilities of the requesting unit's programming language to manipulate the array (step 92).

Those skilled in the art will recognize that requesting units may access the opaque interface in a number of different ways and still remain within the scope of the present invention. For example, a requesting unit may be written in a programming language which includes syntax for accessing the opaque interface. Alternatively, the requesting unit may be written in a programming language which lacks internal syntax for accessing an opaque interface and instead accesses the opaque interface through publicly defined procedure calls.

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention.

The invention claimed is:

1. A method of extending a programming language to support multiple dissimilar object systems, the method comprising the steps of:
   providing a plurality of dissimilar object systems, each of the object systems including the ability to define classes and to construct and utilize objects specific to the object system;
   providing an opaque interface between a requesting unit and said plurality of dissimilar object systems, said requesting unit being executable code written in an array-oriented programming language from an object system different from said plurality of dissimilar object systems, the array-oriented programming language capable of placing objects into an array and indexing said objects, the opaque interface including a defined set of procedures enabling the requesting unit to interact with the plurality of object systems through the opaque interface, the defined set of procedures enabling said interaction without the requesting unit having knowledge of the implementation of the object system;
   specifying a format for at least one defined set of functions for use in said opaque interface;
   creating more than one of said defined set of functions for use in said opaque interface, each said set of functions associated with a specific one of the plurality of dissimilar object systems, each of the at least one defined set of functions valid only for the associated object system, each said defined set of functions accessible by said set of procedures and executable within said object system; and
   using said opaque interface for communications between said requesting unit and at least one of said object systems.

2. The method of claim 1 wherein the format for the at least one defined set of functions is an abstract base class.

3. The method of claim 1, comprising the further step of:
   creating a unique identifier for each said object system and the set of functions associated with each said object system;
   registering each said object system and the set of functions associated with the object system with said opaque interface, said registering using said unique identifier; and
   maintaining a record of registered identifiers with said opaque interface.

4. The method of claim 3, comprising the further step of:
   searching a plurality of said sets of functions registered with said opaque interface using a search key;
   identifying a selected set of functions and its associated object system based on a response to said search key; and
   using the identified selected set of functions to perform operations involving said object system.

5. The method of claim 4 wherein said search key is a class name.

6. The method of claim 4 wherein said search key is an unknown object system computer instruction.

7. The method of claim 4 wherein one of said set of procedures in said opaque interface is used in said searching a plurality of said sets of functions, said one of said set of procedures called by said requesting unit.

8. The method of claim 3, comprising the further steps of:
   calling one of said set of procedures in said opaque interface with said requesting unit, said one of said set of procedures creating an opaque array for objects of a selected object system by calling one of said set of functions associated with said selected object system, said opaque array holding objects of said selected object system with object details hidden from said requesting unit; and
   returning said opaque array to said requesting unit using said one of said set of procedures, said array including the identifier of the selected object system as an array element.

9. The method of claim 8 wherein said opaque array returned to said requesting unit is an opaque array using an indexing method from said selected object system.

10. The method of claim 8 wherein said opaque array returned to said requesting unit is a class opaque array, said array elements being classes from said selected object system.

11. The method of claim 8 wherein said opaque array returned to said requesting unit is a method opaque array, said array elements being methods from said selected object system.

12. The method of claim 8 wherein said opaque array returned to said requesting unit is an object opaque array, said array elements being objects from said selected object system.

13. The method of claim 8 wherein said opaque array returned to said requesting unit is an object attribute opaque array, said array elements being object attributes from said selected object system.

14. The method of claim 10, comprising the further steps of:
   calling one of said set of procedures in said opaque interface with said requesting unit to create an array capable of holding objects of a selected object system;
   calling one of a defined set of functions associated with said selected object system with said one of said set of procedures
   determining with said one of a defined set of functions that the selected object system is not array-oriented;
   creating said array capable of holding objects of said selected object system with said one of said set of procedures; and
   returning said array capable of holding objects of said selected object system to said requesting unit, said array including an identifier of the selected object system as an array element.

15. The method of claim 14 wherein said array capable of holding objects of said selected object system is an array using an indexing method from the same programming language as said requesting unit.

16. The method of claim 14 wherein said array is a class opaque array, said array elements being classes from said selected object system.

17. The method of claim 14 wherein said array is a method opaque array, said array elements being methods from said selected object system.

18. The method of claim 14 wherein said array is an object opaque array, said array elements being objects from said selected object system.

19. The method of claim 14 wherein said array is an object attribute opaque array, said array elements being object attributes from said selected object system.

20. The method of claim 1, comprising the further step of:
   creating said opaque interface using the same programming language as said requesting unit.

21. The method of claim 1 wherein said requesting unit is an applet.

22. The method of claim 1 wherein said requesting unit is an application.

23. The method of claim 1 wherein said requesting unit is a script.

24. A method of extending a programming language to support multiple dissimilar object systems, said method comprising the steps of:
   specifying a format for at least one defined set of functions for use in an opaque interface;
   creating the opaque interface between a requesting unit and a plurality of dissimilar object systems, said requesting unit being executable code written in a programming language from an object system different from said plurality of dissimilar object systems, each said object system including the ability to define classes and to construct and utilize objects specific to said object system, said opaque interface including a defined set of procedures enabling said requesting unit to interact with said plurality of object systems through said opaque interface;
   creating more than one of said defined set of functions for use in said opaque interface each said set of functions associated with a specific one of the plurality of dissimilar object systems each of the at least one defined set of functions valid only for the associated object system, each said defined set of functions accessible by said set of procedures and executable within said object system;
   submitting a registration request for each of said plurality of object systems to said opaque interface, each said registration request including an object system identifier and a defined set of functions which are associated with each object system;
   calling one of said defined set of procedures with said requesting unit to perform a selected object system operation;
   calling one of said defined set of functions associated with the selected object system with said one of said defined set of procedures to perform said selected object system operation;
   performing said selected object system operation with said one of said defined set of functions, said function returning the result of said selected object system operation to said requesting unit.

25. The method of claim 24 wherein said selected object system operation is the creation of an array capable of holding objects of said selected object system.

26. The method of claim 24 wherein said opaque interface specifies a format for the defined set of functions through the use of an abstract base class.

27. A medium holding computer-executable instructions for extending a programming language to support multiple dissimilar object systems, said instructions comprising the steps of:
   specifying a format for at least one defined set of functions for use in said opaque interface;
   creating the opaque interface between a requesting unit and a plurality of dissimilar object systems, said requesting unit being executable code written in a programming language from an object system different from said plurality of dissimilar object systems, each said object system including the ability to define classes and to construct and utilize objects specific to said object system, said opaque interface including a defined set of procedures enabling said requesting unit to interact with said plurality of object systems through said opaque interface;
   creating more than one of said defined set of functions for use in said opaque interface, each said set of functions associated with a specific one of the plurality of dissimilar object systems, each of the at least one defined set of functions valid only for the associated object system, each said defined set of functions accessible by said set of procedures and executable within said object system;
   registering each of said plurality of object systems with said opaque interface, each said registration including an object system identifier and a defined set of functions associated with each object system;
   accessing a selected one of said object systems from said requesting unit through one of said defined set of procedures in said opaque interface, said one of said defined set of procedures calling one of said defined set of functions associated with said selected one of said object systems; and performing an operation in said selected object system with said one of said defined set of functions, said function returning the result of said operation to said requesting unit.

28. The medium of claim 27 wherein said requesting unit interacts with said object system over a network.

29. In a computer system, a medium holding computer-executable instructions for extending a programming language to support multiple dissimilar object systems, the instructions comprising the steps of:

providing a plurality of dissimilar object systems, each of the object system including the ability to define classes and to construct and utilize objects specific to the object system;

specifying a format for at least one defined set of functions for use in an opaque interface;

providing the opaque interface between a requesting unit and said plurality of dissimilar object systems, said requesting unit being executable code written in an array-oriented programming language from an object system different from said plurality of dissimilar object systems, the array-oriented programming language capable of placing objects into an array and indexing said objects, the opaque interface including a defined set of procedures enabling the requesting unit to interact with the plurality of object systems through the opaque interface, the defined set of procedures enabling said interaction without the requesting unit having knowledge of the object system;

creating more than one of said defined set of functions for use in said opaque interface, each said set of functions associated with a specific one of the plurality of dissimilar object systems, each of the at least one defined set of functions valid only for the associated object system, each said defined set of functions accessible by said set of procedures and executable within said object system; and using said opaque interface for communications between said requesting unit and at least one of said object systems.

30. The medium of claim 29 wherein the format for the at least one defined set of functions is an abstract base class.

31. The medium of claim 29, wherein the instructions comprise the further steps of:

creating a unique identifier for each said object system and the set of functions associated with each said object system;

registering each said object system and the set of functions associated with the object system with said opaque interface, said registering using said unique identifier; and maintaining a record of registered identifiers with said opaque interface.

32. The medium of claim 31, wherein the instructions comprise the further steps of:

searching a plurality of said sets of functions registered with said opaque interface using a search key;

identifying a selected set of functions and its associated object system based on a response to said search key; and using the identified selected set of functions to perform operations involving said object system.

33. The medium of claim 32 wherein one of said set of procedures in said opaque interface is used in said searching a plurality of said sets of functions, said one of said set of procedures called by said requesting unit.

* * * * *